(12) United States Patent
Fisher

(10) Patent No.: US 6,279,955 B1
(45) Date of Patent: Aug. 28, 2001

(54) MOBILE STORAGE TANK

(75) Inventor: Dwight C. Fisher, Kure Beach, NC (US)

(73) Assignee: Container Products Corporation, Wilmington, NC (US)

( * ) Notice: Subject to any disclaimer, the term of this patent is extended or adjusted under 35 U.S.C. 154(b) by 0 days.

(21) Appl. No.: 09/293,200

(22) Filed: Apr. 16, 1999

(51) Int. Cl.[7] ........................................ B60P 3/22
(52) U.S. Cl. ........................ 280/837; 182/127; 220/1.5; D12/95
(58) Field of Search ........................ 280/836, 837, 280/838, 839, 163, 423.1; 182/127, 83; 105/358; D12/89, 95; 220/1.5; 296/181

(56) References Cited

U.S. PATENT DOCUMENTS

| D. 253,051 | 10/1979 | Pletcher ................................. D12/95 |
| D. 301,326 | 5/1989 | Adams ................................... D12/95 |
| D. 318,033 | 7/1991 | Pelt ......................................... D12/95 |
| D. 348,304 | 6/1994 | Norman, Jr. et al. .............. D23/202 |
| D. 353,352 | 12/1994 | Holloway, Jr. ....................... D12/95 |
| D. 375,470 | 11/1996 | Adams ................................... D12/95 |
| D. 379,948 | 6/1997 | Wade ..................................... D12/95 |
| D. 417,171 | * 11/1999 | Satterfield et al. ................... D12/95 |
| 3,884,373 | * 5/1975 | Archibald ............................. 105/358 |
| 4,230,048 | * 10/1980 | Gordon et al. ....................... 105/358 |
| 4,244,523 | * 1/1981 | Looper . |
| 4,351,478 | * 9/1982 | Looper . |
| 4,406,471 | 9/1983 | Holloway ............................. 280/5 C |
| 4,589,565 | 5/1986 | Spivey .................................. 220/71 |
| 4,874,184 | * 10/1989 | Boyer ................................. 280/423.1 |
| 5,004,269 | 4/1991 | Pelt ...................................... 280/837 |
| 5,058,924 | 10/1991 | Whatley, Jr. ........................ 280/837 |
| 5,213,367 | 5/1993 | Norman, Jr. et al. .............. 280/837 |
| 5,653,469 | 8/1997 | Wade .................................... 280/837 |
| 5,718,382 | * 2/1998 | Jaeger . |
| 5,816,423 | * 10/1998 | Fenton et al. ........................ 220/1.5 |
| 5,957,500 | * 9/1999 | Wade .................................... 280/837 |

* cited by examiner

*Primary Examiner*—J. J. Swann
*Assistant Examiner*—Christopher Bottorff
(74) *Attorney, Agent, or Firm*—Myers Bigel Sibley & Sajovec

(57) ABSTRACT

A mobile storage tank has a length and includes a container having first and second opposed ends and a length extending therebetween. A stairway is mounted on the first end of the container. The stairway extends transverse to the length. An auxiliary storage section forms a part of the container and extends from the first end thereof. The auxiliary storage section underlies the stairway. At least one wheel is connected to the container for transporting the tank.

19 Claims, 8 Drawing Sheets

MOBILE STORAGE TANK

FIELD OF THE INVENTION

The present invention relates to storage tanks, and, more particularly, to mobile storage tanks.

BACKGROUND OF THE INVENTION

Large storage tanks are often used for storing and dispensing fluids such as fracturing liquids, fluids from environmental cleanups, and various other industrial fluids. When emptied, the tanks may be towed by a truck from one site to another, where they may be refilled and reused. Various federal, state and local highway regulations limit the size of such tanks for over-the-road transport. Accordingly, there is a need for a mobile storage tank which enhances the capacity of the tank while nonetheless being capable of over-the-road transport in compliance with federal, state and local regulations. Further, there is a need for such a mobile storage tank with enhanced convenience and safety for operators and technicians.

SUMMARY OF THE INVENTION

The present invention is directed to a tank which provides enhanced storage capacity as well as improved convenience and safety for an operator, while nonetheless allowing the tank to be towed on public highways. A mobile storage tank of the present invention includes a container having first and second opposed ends and a length extending therebetween. A stairway is mounted on the first end of the container. The stairway extends transverse to the length. An auxiliary storage section forms a part of the container and extends from the first end thereof. The auxiliary storage section underlies the stairway. At least one wheel is connected to the container for transporting the tank.

Preferably, the auxiliary storage section is located at the first end of the container and the at least one wheel is located at the second end of the container. A pull bar may be provided on the first end. Preferably, the container includes a roof panel and an upper end of the stairway is positioned adjacent the roof panel. The container may also include a bottom panel with a lower end of the stairway being positioned substantially adjacent the bottom panel.

According to certain preferred embodiments, the present invention is directed to a mobile fluid storage tank having first and second opposed ends and a length extending therebetween. The tank includes a container including first and second spaced apart, opposed side walls extending along the length. A roof panel extends between the first and second side walls and along the length. A first vertically extending end wall extends between the side walls and adjoins the roof panel. A second vertically extending end wall extends between the side walls. The second end wall is spaced from and opposite the first end wall. A sloped panel extends between the first and second side walls and between the first and second end walls and connects the first and second end walls. The sloped panel extends transverse to the length. The first and second end walls and the sloped panel define an auxiliary storage section. A stairway is mounted on the container and overlies the sloped panel. The stairway extends transverse to the length. At least one wheel is connected to the container for transporting the tank.

Preferably, the auxiliary storage section is located at the first end of the tank and the at least one wheel is located at the second end of the tank. The container may include a second roof panel extending between the first roof panel and the second end, whereby the first roof panel and the first and second side walls define a forward storage section of the container and the second roof panel and the first and second side walls define a rear storage section. The first roof panel is positioned lower than the second roof panel.

A third roof panel may be provided which slopes downwardly from the second roof panel to the first end wall. A vertically extending step wall extends between the first roof panel and the third roof panel and is positioned between and spaced apart from the first and second side walls. The third roof panel, the step wall and the first side wall define a supplemental storage section of the container positioned forwardly of the rear storage section.

The tank may include a side reinforcing channel member secured to the first side wall and a roof reinforcing channel member secured to the second roof panel. An end portion of one of the side and roof reinforcing channel members is received and secured within a portion of the other of the side and roof reinforcing channel members.

The present invention is further directed to a mobile storage tank including a container having a pair of opposed, spaced apart side walls and a roof panel extending therebetween. A plurality of spaced apart cleaning access ports are formed in the roof panel along the length. Each of the cleaning access ports are adapted to receive and engage a rotary spray nozzle. At least one wheel is connected to the container for transporting the tank. The tank may further include a spray nozzle rotatably mounted in one of the cleaning access ports and operable to apply a cleaning fluid onto interior surfaces of the side walls.

DETAILED DESCRIPTION OF THE PREFERRED EMBODIMENT

Figure 1:
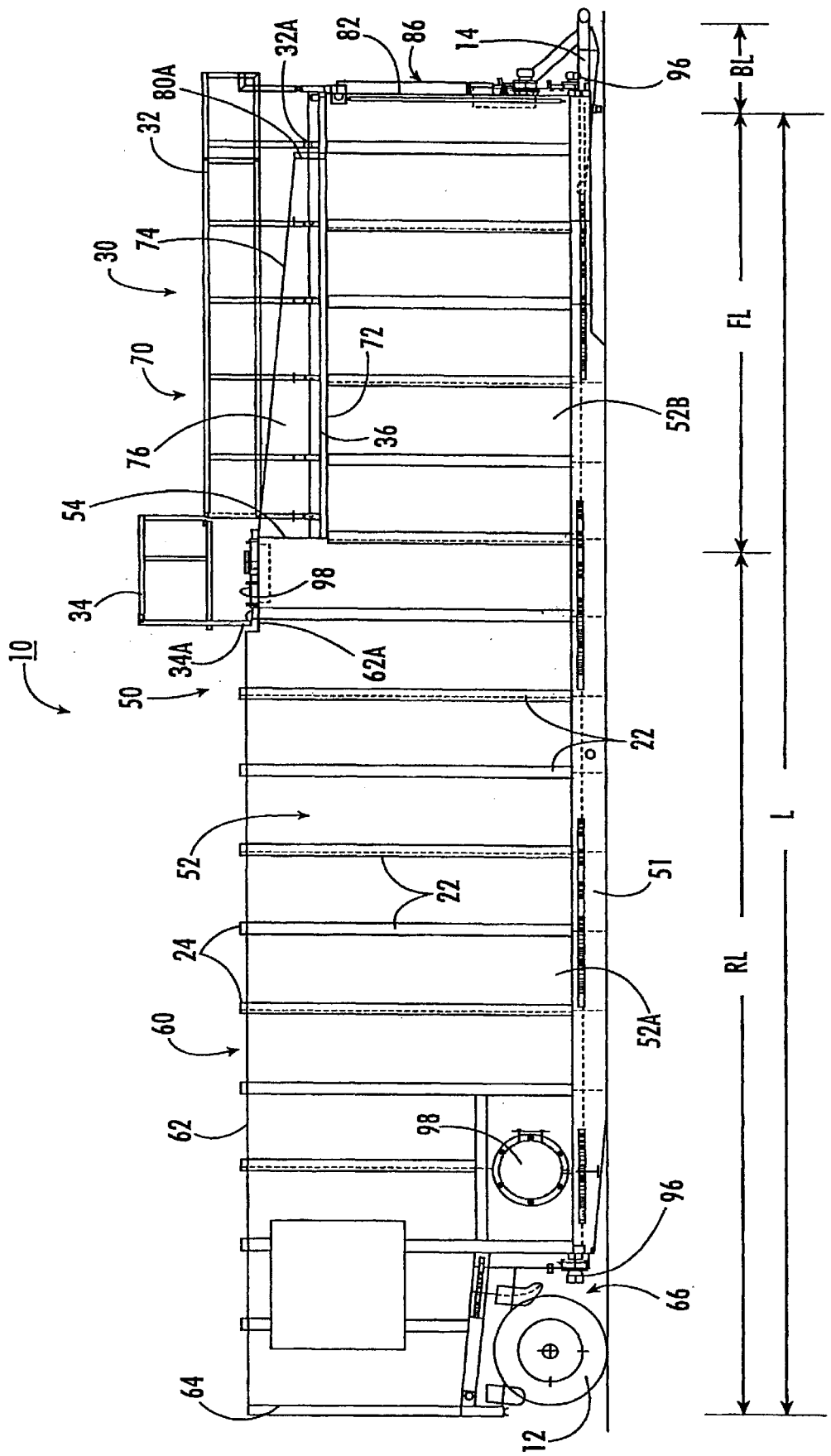
FIG. 1 is a side elevational view of a mobile storage tank according to the present invention in a stationary, storing position.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

Figure 2:
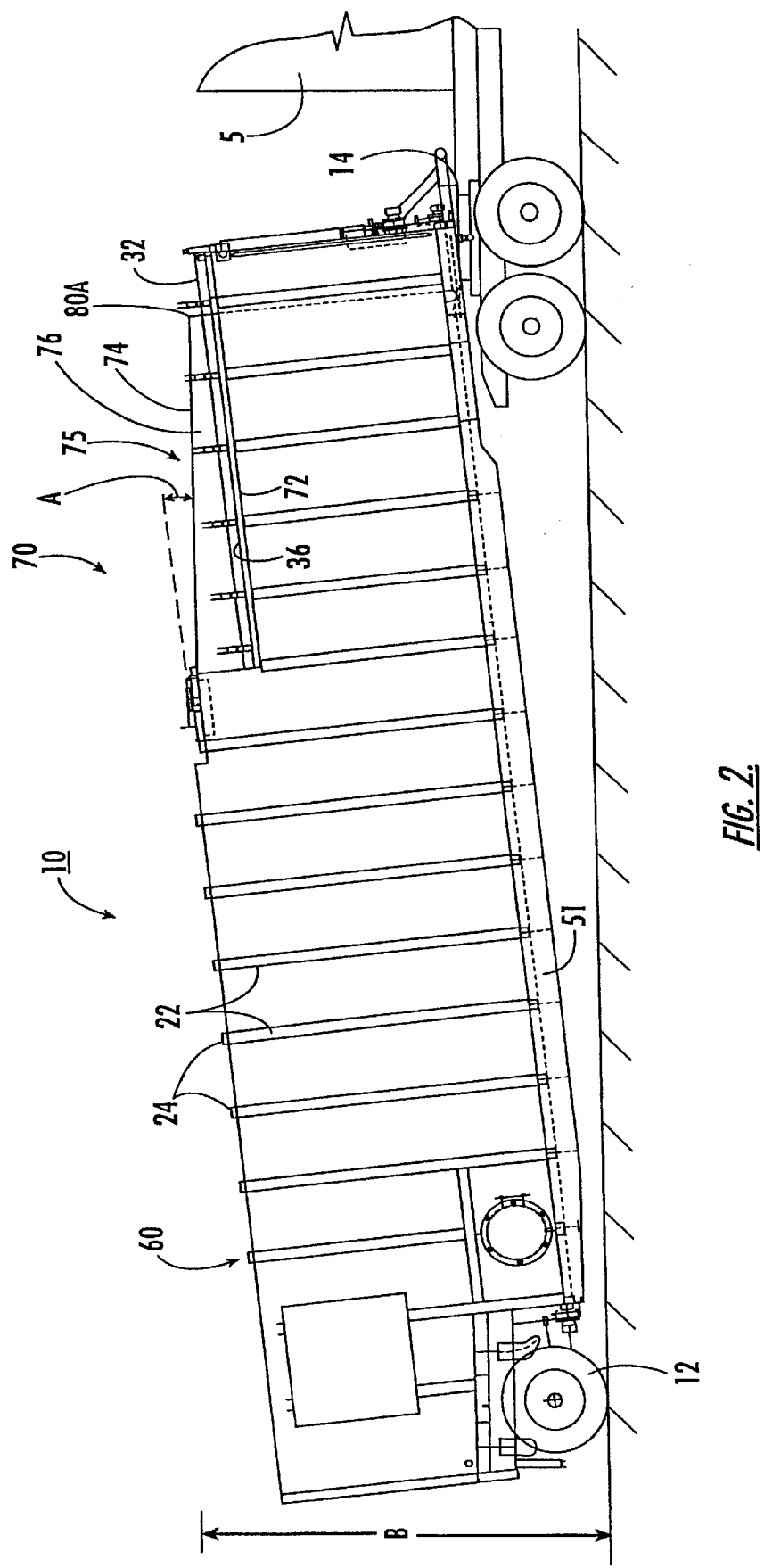
FIG. 2 is a right side elevational view of the tank of FIG. 1 connected to a truck and in a transport position.
Figure 3:
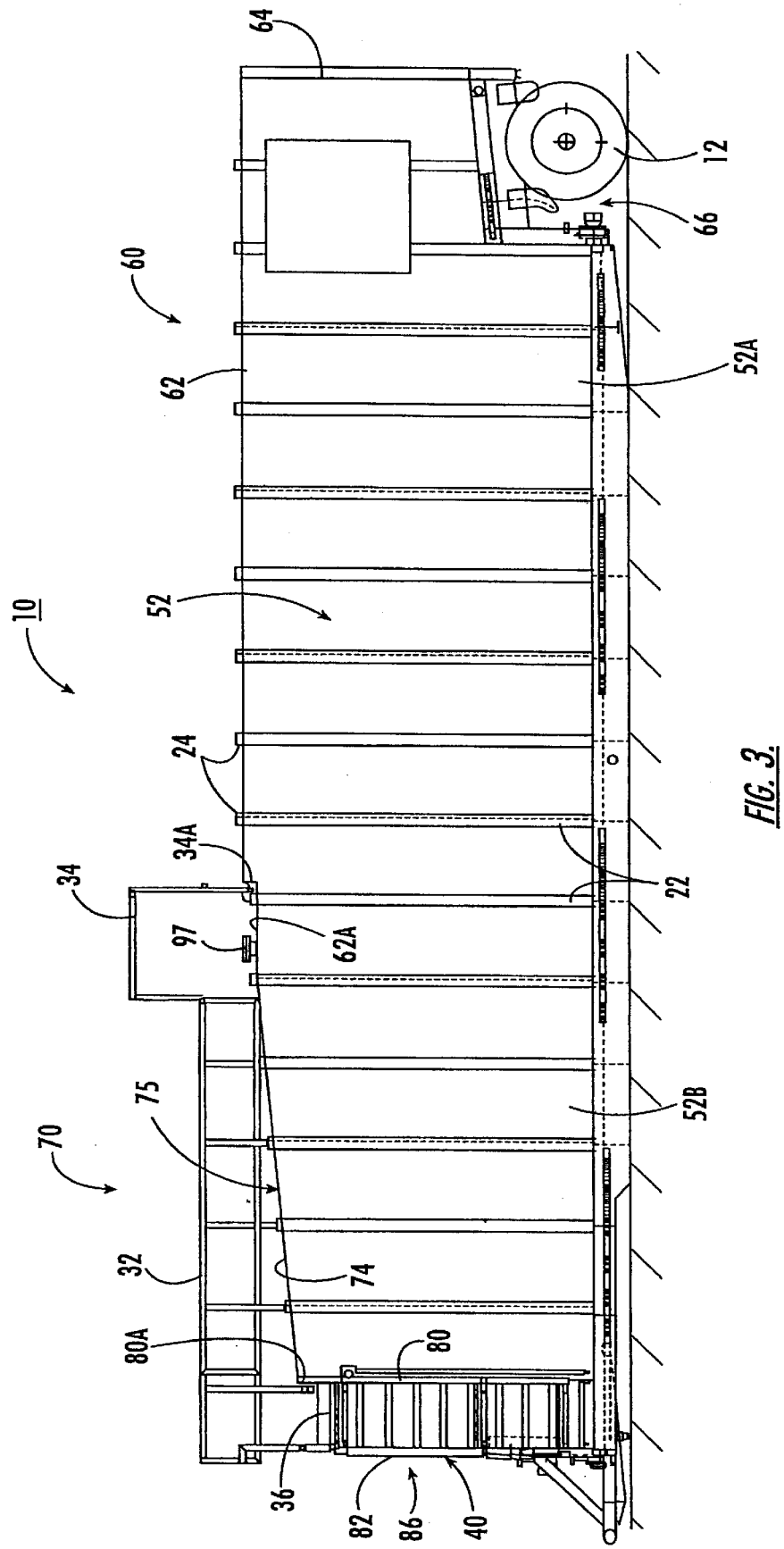
FIG. 3 is a left side elevational view of the tank of FIG. 1.

With reference to FIGS. 1–6, a mobile storage tank according to the present invention is shown therein and indicated generally by the numeral 10. The tank 10 is adapted to receive, hold and dispense fluids while in a stationary position as shown in FIG. 1 and to be transported by a truck 5 or the like, typically when empty of fluid, when in a transport position as shown in FIG. 2.

Figure 8:
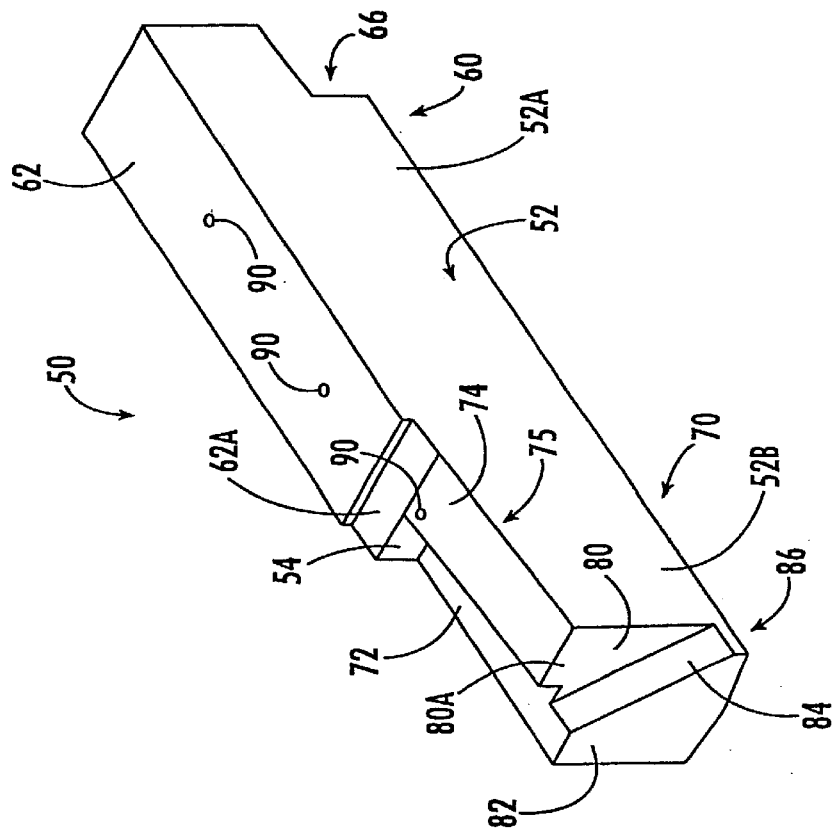
FIG. 8 is a front, right isometric view of the container of FIG. 7.
Figure 7:
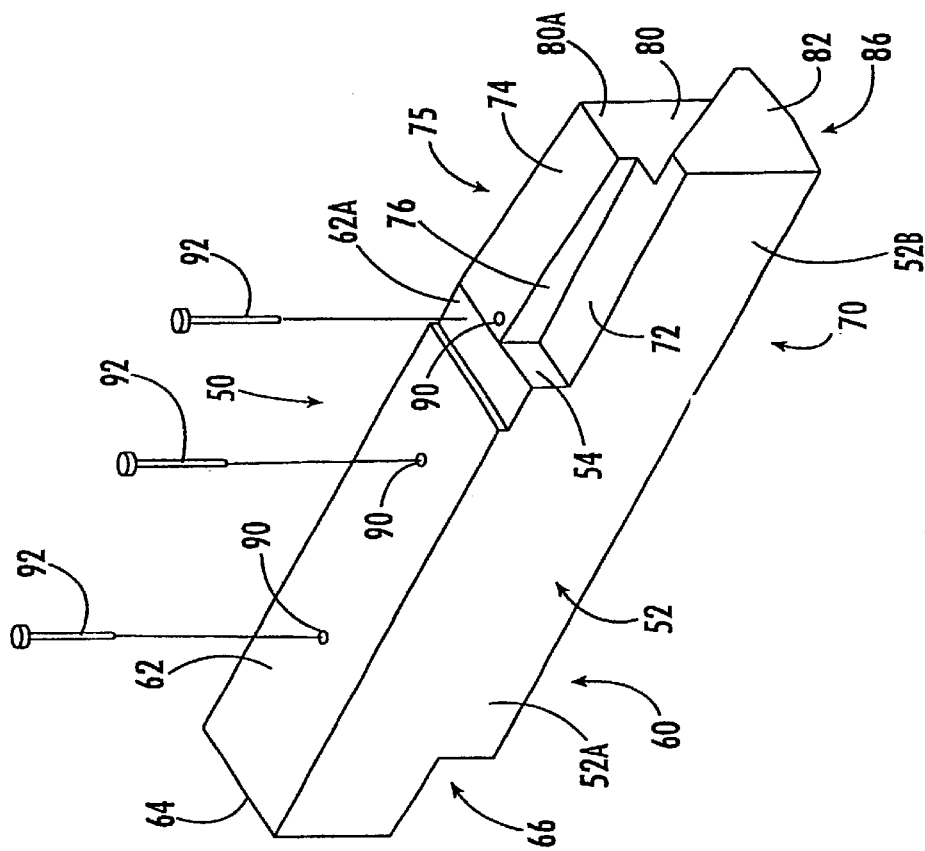
FIG. 7 is a front, left isometric view of a container forming a part of the tank of FIG. 1.

With reference to FIGS. 1–8, the tank 10 includes a container 50. FIGS. 7 and 8 show the container 50 without the remaining components of the tank 10. The container 50 has a forward section 70 and a rear section 60. The sections 60, 70 have common side walls 52. Each side wall 52 has a portion 52A forming a part of the rear section 60 and a portion 52B forming a part of the forward section 70. The sections 60, 70 also share a common bottom panel 53 (see FIG. 5). Lengthwise skids 51 extend along the lower edges of the side walls 52 and support the tank 10 in the stationary position (FIG. 1).

The rear section 60 is further defined by a roof panel 62, a roof panel 62A, a rear panel 64 and a wheel well 66. Wheels 12 are mounted in the wheel wells 66.

The forward section 70 is further defined by the bottom panel 53, a walkway roof panel 72, a sloped roof panel 74, a trapezoidally shaped vertical wall 76 between the roof panel 72 and the roof panel 74, and a first forward, vertical wall 80 (including an upper portion 80A). A vertical wall 54 extends from the walkway roof panel 72 to the rear roof panel 62. The sloped roof panel 74, the wall 76, the upper portion 80A of the forward wall 80, and the upper portion of the side wall portion 52B adjoining the sloped roof panel 74 define a supplemental storage section 75. A second forward, vertical wall 82 and a sloped stairway panel 84 extend between the walls 80, 82. The forward wall 82, the sloped panel 84, a forward portion of the walking roof panel 72, and the side wall portion 52B define an auxiliary or stairway forward extension storage section 86.

Each of the aforementioned walls and panels are preferably formed of flat plate steel. Suitable methods of fabrication will be apparent to those of skill in the art upon reading the description herein.

A stairway assembly 40 is mounted on the sloped panel 84 and extends from the level of the short nose tank pull bar 14 to the level of the walkway roof panel 72. A plurality of steps 42 allow the operator to access the walkway roof panel 72. The lowered height of the walkway roof panel 72 reduces the vertical traverse of the stairway so that the slope of the stairway need not be extreme and a vertical ladder section is not required. Notably, the lower end of the stairway 40 is positioned at approximately the level of the bottom panel 53.

A handrail system 30 is provided adjacent the walkway roof panel 72. The handrail system 30 includes handrails 32 which are pivotally secured to the roof panel 72 by hinge mechanisms 32A so that they may be folded inwardly and downwardly as shown in FIG. 2. A further handrail 33 is foldable onto the handrail 32. A fixed handrail 43 extends along the stairway 40 on its forward side. The handrail system 30 further includes a handrail 34, which is selectively pivotable about hinge mechanisms 34A, to assist the operator in climbing between the front roof panel 72 and the rear roof panel 62.

The roof panel 72 serves as an access walkway and a work platform. A tread plate 36 extends from the vertical wall 54 to the forward wall 82. Preferably, the tread plate 36 has a non-skid surface and is secured directly to the roof panel 72. The tread plate may be, for example, a tread gripping enhanced surface such as diamond plate and/or perforated (preferably with serrations) plate metal.

Preferably, the interior walls of the tank 50 are substantially all smooth and noncorrugated. U-shaped reinforcement channels 24 are secured by welding to the outer surface of the rear roof panels 62, 62A. In the illustrated embodiment, no reinforcement channels are mounted on the roof panels 72, 74. U-shaped reinforcement channel members 22 are secured by welding to the outer surfaces of the side walls 52 along both of the portions 52A and 52B. The channel members 22, 24 are preferably formed of steel.

Figure 9:
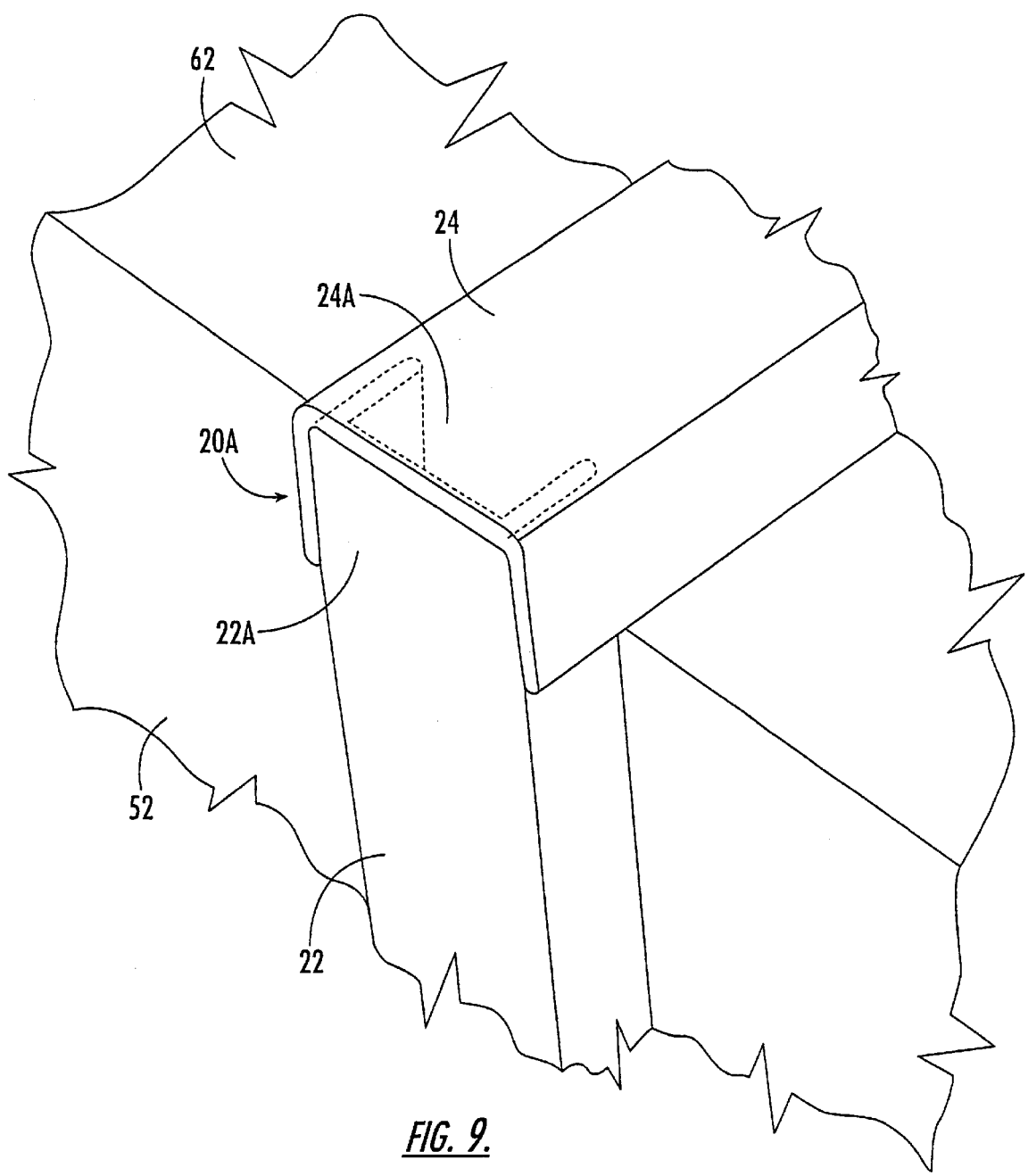
FIG. 9 is an enlarged, perspective, fragmentary view of the tank of FIG. 1 showing a joint between adjacent reinforcing channels of the tank.

With reference to FIG. 9, a joint 20 is formed between each channel member 24 and the adjacent channel member 22 at the corners between the side walls 52 and the rear roof panels 62, 62A. An upper end portion 22A of each such channel member 22 is inserted into an end portion 24A of the adjacent channel member 24 (which extends outwardly beyond the side wall 52) to form the joint 20. The overlapping portions 22A and 24A are welded (weld material not shown). This construction enhances the rigidity of the tank 50 while allowing the interior walls of the container 50 to be smooth and flat. The flat interior walls allow for ease of cleaning and improved application of paint or lining on the tank interior and minimize the accumulation of residue, corrosion and rust.

Preferably, the dimensions of the tank 10 are selected such that, when towed by the intended truck 5, the maximum height B (see FIG. 2) of the tank 10 is no greater than 13 feet 6 inches. With reference to FIG. 1, preferably, the length RL of the rear roof panel is between about 28 and 29 feet, the length FL of the front roof panel 72 is between about 15 and 16 feet, and the length L of the tank 10 between the walls 64 and 82 is between about 43 and 44 feet. Preferably, the pull bar 14 has a length of between about 1 and 3 feet.

Figure 5:
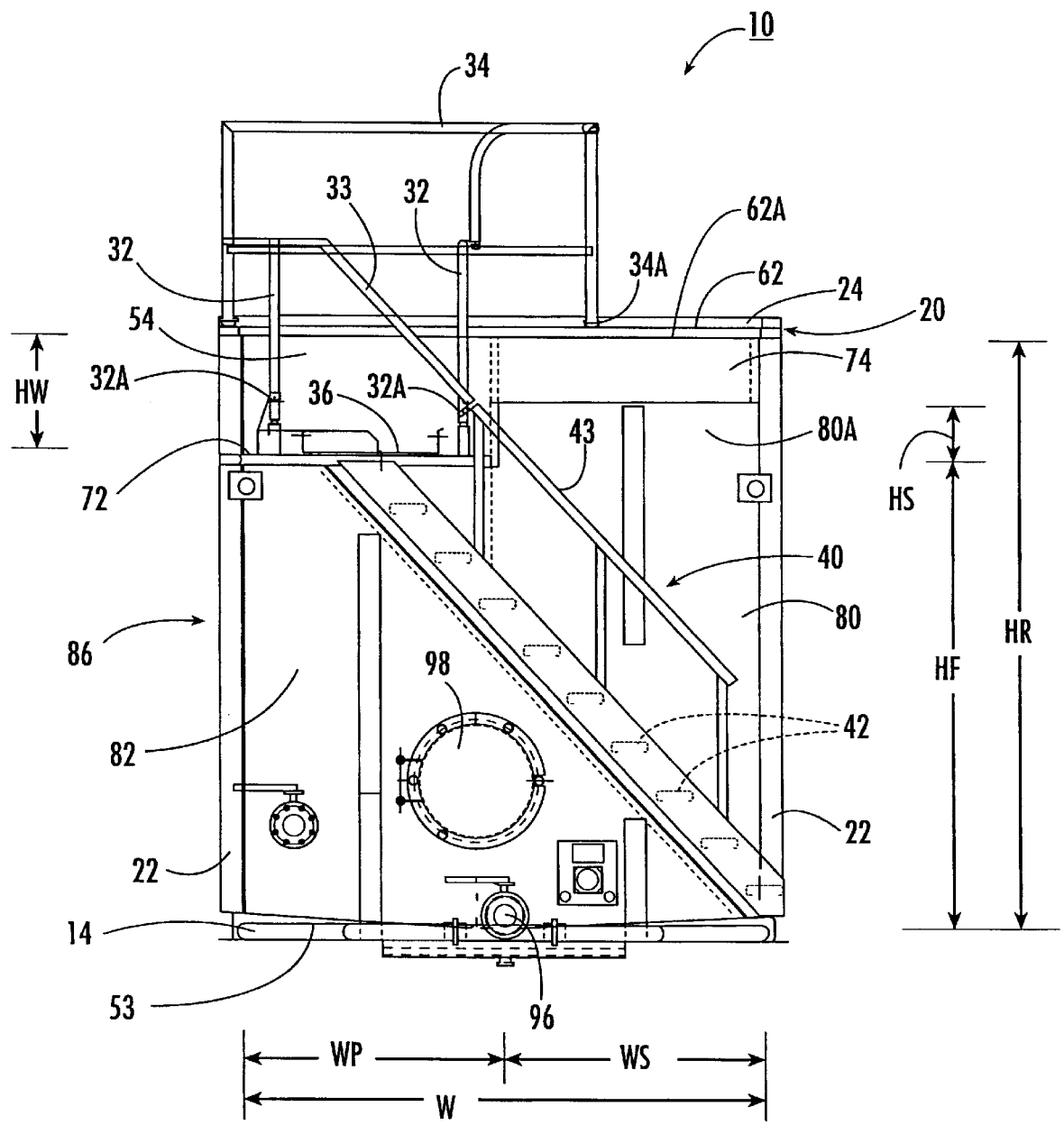
FIG. 5 is a front end plan view of the tank of FIG. 1.
Figure 6:
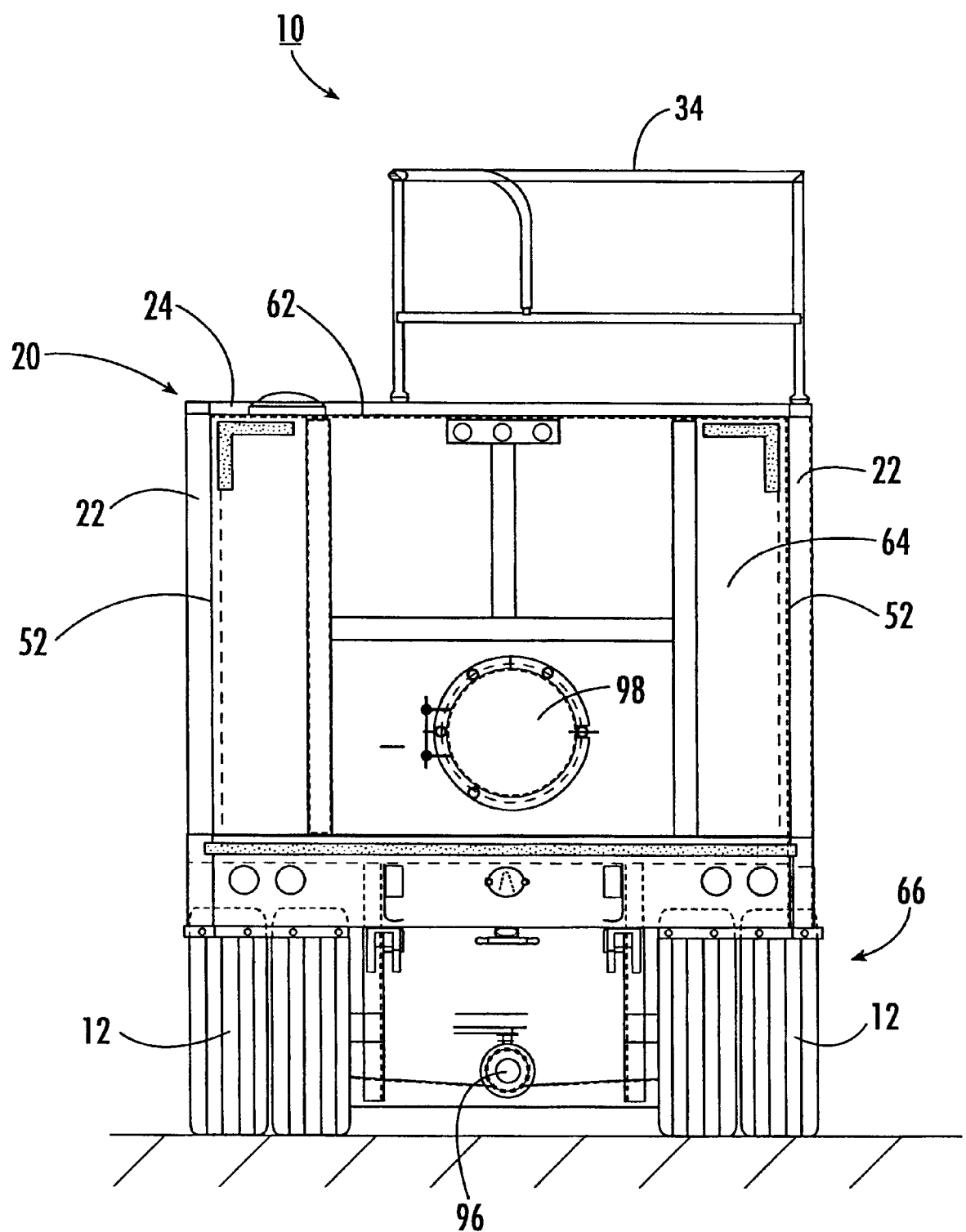
FIG. 6 is a rear end plan view of the tank of FIG. 1.

With reference to FIG. 5, the height HR from the bottom panel 53 to the rear top panel 62 is preferably between about 10 and 11 feet. The vertical drop from the rear roof panel 62 to the rear roof panel 62A is preferably between about 2 and 6 inches. The height HF from the bottom panel 53 to the walkway roof panel 72 is preferably between about 7.5 and 8.5 feet. The height HS of the front wall portion 80A extending between the roof panel 72 and the sloping roof panel 74 is preferably between about 1 and 1.5 feet. The vertical wall 54 preferably has a height HW of between about 1.5 and 2.5 feet. Preferably, the sloped roof panel 74 forms an angle A with respect to horizontal when the tank 50 is placed in the storing position of FIG. 1 on level, unsloped ground.

With further reference to FIG. 5, the width W between the side walls 52 is preferably between about 8 and 8.5 feet. The width WP of the walkway roof panel 72 is preferably between about 2 and 3 feet. Preferably, the width WS of the roof panel 74 is between about 4 and 5 feet.

The tank 50 provides enhanced storage capacity as well as convenience and safety for the operator, while nonetheless allowing the tank to be towed on public highways. The supplemental storage section 75 provides additional capacity when the tank is in the storing position of FIG. 1 but does not increase the peak height of the tank when being towed. The auxiliary or forward extension storage section 86 provides additional storage capacity beneath the stairway assembly 40 without interfering with the use of the stairway assembly 40. Moreover, because the stairway assembly 40 and the sloped panel 84 extend transverse to the length of the tank, the length and overall size of the walkway roof panel 72 is maximized without requiring a steep stairway incline or a ladder. Accordingly, the operator is provided with both safe and convenient access as well as a sizable work surface.

Figure 4:
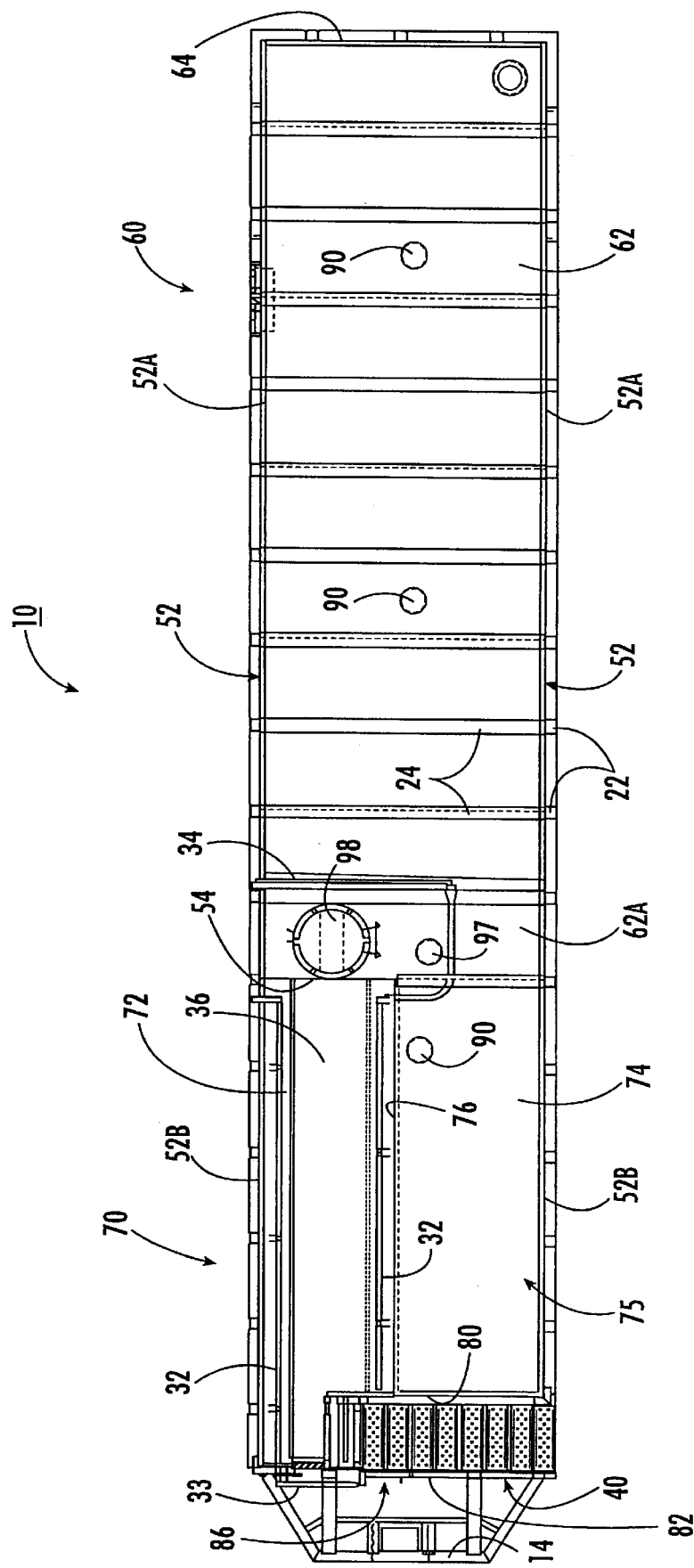
FIG. 4 is a top plan view of the tank of FIG. 1.

With reference to FIGS. 4 and 7, three spaced apart cleaning access ports 90 are provided in the roof panels 74, 62. The cleaning ports 90 each have a diameter of from about 3 to 5 inches. The ports 90 are adapted to receive rotary spray nozzles 92 (see FIG. 7). The spray nozzles 92 are preferably driven by air or electric motor to rotate with respect to the respective ports 90. Suitable spray nozzles 92 include tank washer model 190AH or tank washer model 290A from Spraying Systems Co. of Wheaton, Ill. Each spray nozzle 92 may include a mounting collar (e.g., pipe flange) rotatably mounted on the spray nozzle. Suitable mounting adapters such as pipe flanges or universal adapters are mounted about the ports 90 for holding the nozzles 92. When not in use, the ports 90 may be capped as shown in FIG. 4.

Dispensing/fill valves 96 are provided in the rear panel 64 and the forward wall 82. Manways 98 are provided in the side wall 52, the rear panel 64, the roof panel 62 and the forward wall 82. Preferably, the manways each have a diameter of between about 22 and 24 inches. A fill port 97 is provided in the roof panel 62 adjacent the handrail 34.

While the embodiment as described hereinabove is preferred, it is also contemplated that a stairway assembly and an auxiliary storage section underlying the stairway assembly may be provided on the rear end of the tank 10 in place of or in addition to the stairway assembly 40 and the auxiliary storage section 86 of the forward end.

The tank 10 may be used to store any suitable fluid. For example, the tank 10 may be used to store water, fracturing liquids, fluids collected from environmental cleanups, liquid by-products of industrial chemical processes, and the like.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A mobile fluid storage tank having first and second opposed ends and a length extending therebetween, said tank comprising:
    a) a container including:
        first and second spaced apart, opposed side walls extending along said length;
        a first roof panel extending between said first and second side walls and along said length;
        a first vertically extending end wall extending between said side walls and adjoining said first roof panel;
        a second vertically extending end wall extending between said side walls, said second end wall spaced from and opposite said first end wall;
        a sloped panel extending between said first and second side walls and between said first and second end walls and connecting said first and second end walls, said sloped panel extending transverse to said length; and
        a second roof panel extending between said first roof panel and said second end, whereby said first roof panel and said first and second side walls define a forward storage section of said container and said second roof panel and said first and second side walls define a rear storage section, wherein said first roof panel is positioned lower than said second roof panel;
        wherein said first and second end walls and said sloped panel define an auxiliary storage section;
    b) a stairway mounted on said container and overlying said sloped panel, said stairway extending transverse to said length;
    c) at least one wheel connected to said container for transporting said tank; and
    d) a side reinforcing channel member secured to said first side wall and a roof reinforcing channel member secured to said second roof panel, wherein an end portion of one of said side and roof reinforcing channel members is received and secured within a portion of the other of said side and roof reinforcing channel members.

2. The tank of claim 1 wherein said auxiliary storage section is located at said first end of said tank and said at least one wheel is located at said second end of said tank.

3. The tank of claim 1 including:
    a third roof panel sloping downwardly from said second roof panel to said first end wall; and
    a vertically extending step wall extending between said first roof panel and said third roof panel and positioned between and spaced apart from said first and second side walls;
    said third roof panel, said step wall and said first side wall defining a supplemental storage section of said container, said supplemental storage section positioned forwardly of said rear storage section.

4. The tank of claim 3 including a cleaning access port formed in at least one of said first, second and third roof panels and adapted to receive a spray cleaning nozzle.

5. The tank of claim 3 including a plurality of said cleaning access ports spaced apart on along said length of said tank.

6. The tank of claim 4 including a spray cleaning nozzle rotatably mounted in said cleaning access port.

7. The tank of claim 1 including a pull bar on said first end.

8. The tank of claim 1 including a tread plate overlying said roof panel.

9. The tank of claim 1 including a handrail assembly adjacent said roof panel.

10. The tank of claim 1 including a bottom panel and wherein said stairway has a lower end positioned substantially adjacent said bottom panel.

11. A storage tank comprising:
    a) a container including a roof panel and a side wall defining a corner;
    b) a side reinforcing channel member secured to said side wall and having an end portion; and
    c) a roof reinforcing channel member secured to said roof panel and having an end portion;
    d) wherein one of said end portions is received and secured within the other of said end portions.

12. The tank of claim 11 wherein said end portion of said roof panel channel member extends beyond each of said side wall and said roof panel and said end portion of said side channel member is received and secured within said end portion of said roof channel member.

13. A mobile fluid storage tank having forward and rear opposed ends and a length extending therebetween, said tank comprising:
   a) a container including:
      first and second spaced apart, opposed side walls extending along said length;
      a bottom panel extending between said first and second side walls and along said length;
      a first roof panel extending between said first and second side walls and along said length, said first roof panel and said first and second side walls defining a forward storage section of said container;
      a second roof panel extending between said first roof panel and said rear end, said second roof panel and said first and second side walls defining a rear storage section, wherein said first roof panel is positioned lower than said second roof panel;
      a first vertically extending end wall on said forward end, said first end wall extending between said side walls and adjoining said first roof panel;
      a second vertically extending end wall on said forward end, said second end wall extending between said side walls, said second end wall forwardly spaced from and opposite said first end wall;
      a sloped panel extending between said first and second side walls and between said first and second end walls and connecting said first and second end walls, said sloped panel extending transverse to said length;
      a third roof panel sloping downwardly from said second roof panel to said first end wall; and
      a vertically extending step wall extending between said first roof panel and said third roof panel and positioned between and spaced apart from said first and second side walls;
      said third roof panel, said step wall and said first side wall defining a supplemental storage section of said container, said supplemental storage section positioned forwardly of said rear storage section;
      wherein said first and second end walls and said sloped panel define an auxiliary storage section extending from said forward end;
   b) a stairway mounted on said container and overlying said sloped panel, said stairway extending transverse to said length wherein said stairway has a lower end positioned substantially adjacent said bottom panel;
   c) at least one wheel positioned at said rear end and connected to said container for transporting said tank; and
   d) a side reinforcing channel member secured to said first side wall and a roof reinforcing channel member secured to said second roof panel, wherein an end portion of one of said side and roof reinforcing channel members is received and secured within a Portion of the other of said side and roof reinforcing channel members.

14. The tank of claim 12 including a cleaning access port formed in at least one of said first, second and third roof panels and adapted to receive a spray cleaning nozzle.

15. The tank of claim 14 including a plurality of said cleaning access ports spaced apart on along said length of said tank.

16. The tank of claim 14 including a spray cleaning nozzle rotatably mounted in said cleaning access port.

17. The tank of claim 13 including a pull bar on said first end.

18. The tank of claim 13 including a tread plate overlying said first roof panel.

19. The tank of claim 13 including a handrail assembly adjacent said first roof panel.

* * * * *

UNITED STATES PATENT AND TRADEMARK OFFICE
CERTIFICATE OF CORRECTION

PATENT NO. : 6,279,955 B1  
DATED : August 28, 2001  
INVENTOR(S) : Dwight C. Fisher Page 1 of 1

It is certified that error appears in the above-identified patent and that said Letters Patent is hereby corrected as shown below:

<u>Column 6,</u>
Line 41, delete "3" and insert -- 4 --.

<u>Column 8,</u>
Line 21, delete "12" and insert -- 13 --.

Signed and Sealed this

Fourteenth Day of May, 2002

*Attest:*

*Attesting Officer*

JAMES E. ROGAN  
*Director of the United States Patent and Trademark Office*